(12) United States Patent
Noguchi et al.

(10) Patent No.: US 6,806,940 B1
(45) Date of Patent: Oct. 19, 2004

(54) LIQUID CRYSTAL DISPLAY DEVICE WITH PARTICULAR CELL GAP

(75) Inventors: Takuya Noguchi, Shiki-gun (JP); Kazuya Yoshimura, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/491,585

(22) Filed: Jan. 25, 2000

(30) Foreign Application Priority Data

Jan. 29, 1999 (JP) ............................................. 11-021042
Oct. 29, 1999 (JP) ............................................. 11-308130

(51) Int. Cl.⁷ ...................... G02F 1/1333; G02F 1/1339
(52) U.S. Cl. ........................ 349/158; 349/155; 349/157; 349/153
(58) Field of Search ............................. 349/158, 155, 349/153, 157, 190

(56) References Cited

U.S. PATENT DOCUMENTS

| | | | | |
|---|---|---|---|---|
| 4,150,878 A | * | 4/1979 | Barzilai et al. | 350/344 |
| 4,526,818 A | * | 7/1985 | Hoshikawa et al. | |
| 4,834,500 A | * | 5/1989 | Hilsum et al. | 350/331 |
| 4,930,876 A | * | 6/1990 | Suzuki et al. | 350/336 |
| 5,095,378 A | * | 3/1992 | Suzuki | 359/62 |
| 5,307,190 A | * | 4/1994 | Wakita et al. | 349/158 |
| 5,499,127 A | * | 3/1996 | Tsubota et al. | 349/153 |
| 5,537,235 A | * | 7/1996 | Ishihara et al. | 359/81 |
| 5,629,787 A | * | 5/1997 | Tsubota et al. | 349/153 |
| 6,031,051 A | * | 2/2000 | Wu | 525/243 |
| 6,104,467 A | * | 8/2000 | Nakahara et al. | 349/186 |
| 6,166,797 A | * | 12/2000 | Bruzzone et al. | 349/155 |
| 6,322,861 B1 | * | 11/2001 | Wu | 428/1.55 |
| 6,323,929 B1 | * | 11/2001 | Hirakata | 349/151 |
| 6,327,011 B2 | * | 12/2001 | Kim | 349/122 |

FOREIGN PATENT DOCUMENTS

| | | |
|---|---|---|
| JP | 59-173028 | 11/1984 |
| JP | 60-212733 | 10/1985 |
| JP | 02-126231 | 5/1990 |
| JP | 5-33132 | 4/1993 |
| JP | 05-241165 | 9/1993 |
| JP | 05-249444 | 9/1993 |
| JP | 07-020479 | 1/1995 |
| JP | 8-220546 | 8/1996 |
| JP | 8-292412 | 11/1996 |
| JP | 09-329786 | 12/1997 |
| JP | 10-090667 | 4/1998 |
| JP | 10-093092 | 4/1998 |
| JP | 10-096897 | 4/1998 |
| JP | 10-274773 | 10/1998 |
| JP | 11-095228 | 4/1999 |

* cited by examiner

Primary Examiner—Robert H. Kim
Assistant Examiner—Mike Qi
(74) Attorney, Agent, or Firm—Edwards & Angell, LLP; David G. Conlin; George W. Hartnell, III

(57) ABSTRACT

A liquid crystal display device includes a pair of insulating substrates bonded to each other via a sealing material, and liquid crystal filled between a pair of the insulating substrates. A cell gap is formed so as to gradually increase from the center to an end of a display area at room temperature. According to this arrangement, it is possible to smooth out a difference in thermal expansion between the liquid crystal and the sealing material when an atmospheric temperature rises, and it is possible to prevent a cell gap from being too large in the center of the display area. Consequently, an irregular display color can be eliminated.

18 Claims, 13 Drawing Sheets

AT ROOM TEMPERATURE    AT HIGH TEMPERATURE
FIG. 2(a) 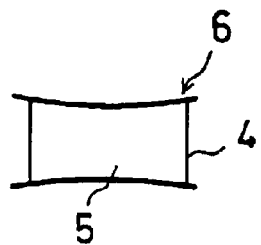  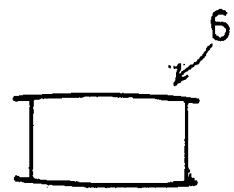
FIG. 2(b) 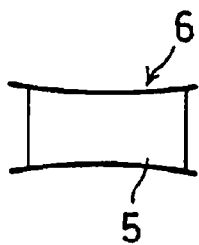  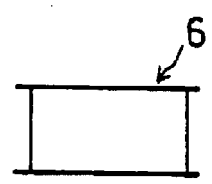
FIG. 2(c) 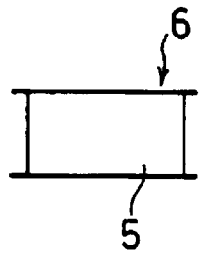  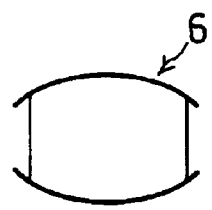
FIG. 2(d) 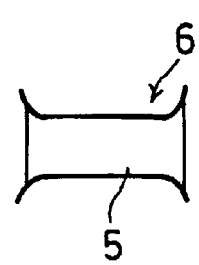  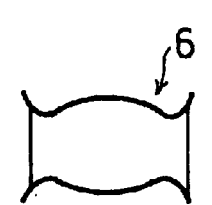
FIG. 2(e) 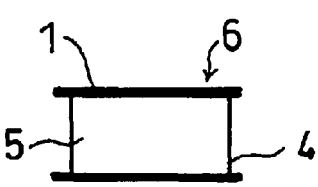  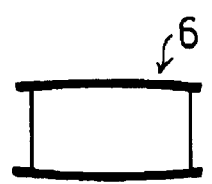

CELL GAP CHANGE RELATIVE TO TEMPERATURE (COMPARATIVE EXAMPLE 2)

AT ROOM TEMPERATURE        AT HIGH TEMPERATURE
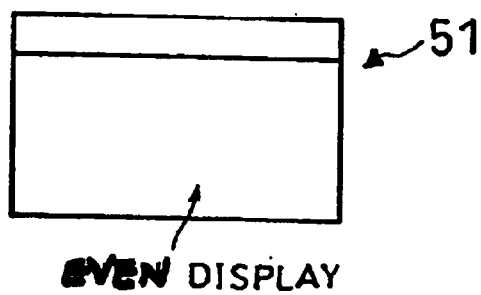 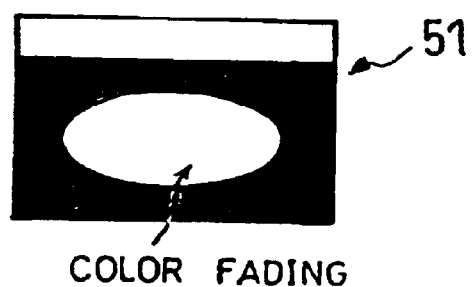
EVEN DISPLAY                COLOR FADING
FIG. 12 PRIOR ART

AT ROOM TEMPERATURE    AT HIGH TEMPERATURE

AT ROOM TEMPERATURE    AT HIGH TEMPERATURE

LIQUID CRYSTAL DISPLAY DEVICE WITH PARTICULAR CELL GAP

FIELD OF THE INVENTION

The present invention relates to a liquid crystal display device which is used for a display of OA equipment, AV equipment, and the like, and particularly concerns a liquid crystal display device which is suitable for use outdoors or in an automobile occasionally at a high temperature.

BACKGROUND OF THE INVENTION

With respect to a specification of a liquid crystal display device required for portable equipment, the demand has been growing for a liquid crystal display device which is thin and lightweight with a wide range of an operating temperature. The operating temperature of the liquid crystal display device generally needs to be set between −20 and 70° C. in view of using outdoors or in an automobile.

Further, in order to realize a liquid crystal display device which is thin and lightweight, a liquid crystal display device has been proposed, in which an insulating substrate has a smaller thickness or a plastic substrate is used.

For instance, in such a liquid crystal display device, two insulating substrates are overlaid to each other via plastic spacers such that a display electrode formed by a transparent conductive film opposes a surface, on which an alignment film and the like are stacked, the substrates are bonded to each other via a sealing material placed on a circumference between the substrates, liquid crystal is filled into a gap between the substrates from an inlet formed on a portion of the sealing material, the inlet is filled with a sealing material made of resin and others, and polarizers are disposed outside the substrates.

After filling liquid crystal from the inlet, when the inlet is sealed with a sealing material such as an ultraviolet curing and thermosetting resin, a pressurized sealing method has been conventionally used, in which both surfaces of a liquid crystal cell are pressurized from the outside such that a liquid crystal layer has an even thickness (cell gap) and the sealing operation is performed with the cell gap being set at a predetermined value. This method is performed for preventing an uneven display, which is caused by a difference in cell gaps.

The pressurized sealing method is disclosed in Japanese Unexamined Patent Publication No. 220546/1996 (Tokukaihei 8-220546, published on Aug. 30, 1996), Japanese Unexamined Utility Model Patent Publication No. 33132/1993 (Jitsukaihei 5-33132, published on Apr. 30, 1993), and others.

Japanese Unexamined Patent Publication No. 220546/1996 discloses a technique for setting a cell gap of the liquid crystal display device at a predetermined value by applying an even pressure to the outer surfaces of the substrates so as to expel excessive liquid crystal.

Japanese Utility Model Patent Publication No. 33132/1993 discloses a technique for eliminating a cell gap difference between a display area and a circumference of the display area that has no electrode, by pressurizing merely an area corresponding to the display area.

Meanwhile, as a method for eliminating an irregular display color resulted from a temperature distribution that is caused by heat conduction from a light source or the outside of a driving circuit, Japanese Unexamined Patent Publication No. 292412/1996 (Tokukaihei 8-292412, published on Nov. 5, 1996) discloses a method for partially changing a cell gap of the liquid crystal display device in accordance with a temperature distribution such that dΔn (product of an index anisotropy Δn and a cell gap d) is substantially even.

In the above liquid crystal display devices, it is possible to realize a uniform cell gap so as to provide an even display at room temperature without causing an irregular display color.

As shown in FIG. 12, a liquid crystal cell 51 does not cause an irregular display color at room temperature; however, an irregular display color 52, in which colors are faded to white, appears at a high temperature (60–70° C.) in the center of the liquid crystal cell 51 when voltage is not applied. This phenomenon occurs in a portable liquid crystal display device such as a mobile phone and a PDA (Personal Digital Assistant), that occasionally operate at a low temperature and a high temperature (−20–70° C.).

It is understood that an irregular display color appears at a high temperature due to irregular coefficients of thermal expansion, regarding main materials constituting a liquid crystal cell of FIG. 1. Namely, as shown in FIG. 13, the liquid crystal cell 51 has an even cell gap at room temperature, so that no irregular display color appears. However, in the case of a higher atmospheric temperature, the coefficient of thermal expansion of a liquid crystal 53 is larger by one digit than that of a sealing material 54, so that an expansion amount of the liquid crystal 53 is larger than that of the sealing material 54. Consequently, the center of the liquid crystal cell expands upward and downward, and the cell gap results in an irregular display color.

TABLE 1

Thermal Expansion Coefficient of Materials (documentary records)

|  | thermal expansion coefficient | ratio |
|---|---|---|
| liquid crystal | $7.2 \times 10^{-4}$ | 100.0 |
| sealing resin | $5.5 \times 10^{-5}$ | 7.6 |
| plastic bead | $8.5 \times 10^{-5}$ | 11.8 |
| glass | $4.5 \times 10^{-6}$ | 0.6 |

Further, the technic disclosed in Japanese Unexamined Patent Publication No. 292412/1996 is devised for responding to a refractive index Δn of the liquid crystal, that fluctuates in accordance with a partial temperature change caused by a certain heat source. In this technique, as shown in FIG. 14, a temperature distribution formed by the heat source is projected in advance and a cell gap thickness is changed in a target area. Therefore, this conventional art does not solve the influence of heat, that is caused by a change in temperature and is exerted upon the entire liquid crystal cell 51. Thus, the center of the liquid crystal cell 51 expands upward and downward and a cell gap difference results in an irregular display color.

SUMMARY OF THE INVENTION

An object of the present invention is to provide a liquid crystal display device for preventing an irregular display color which appears in accordance with an ambient temperature varying from room temperature to a high temperature.

In order to solve the above problem, the liquid crystal device of the present invention, that includes a pair of insulating substrates bonded via a sealing material, and liquid crystal filled between a pair of the insulating substrates, is characterized in that a cell gap is formed so as to gradually increase from the center to an end of a display area at room temperature.

With this arrangement, a cell gap is formed so as to gradually increase from the center to an end of a display area at room temperature in a range that no irregular display appears. Hence, it is possible to smooth out a difference in thermal expansion between the liquid crystal and a sealing material when an atmospheric temperature rises, and it is possible to prevent a cell gap from being too large in the center of the display area. Consequently, an irregular display color can be eliminated.

The liquid crystal display device of the present invention is effectively used for an STN liquid crystal display device, in which an operating temperature ranges from room temperature to a high temperature. Particularly, the aforementioned problem frequently appears at a high temperature. Therefore, a cell gap is formed so as to gradually increase from the center to an end of the display area at room temperature in a range that no irregular display color appears, so that it is possible to smooth out a difference in thermal expansion amounts between the liquid crystal and the sealing material at a high temperature. Consequently, an irregular display color can be prevented at a high temperature.

Here, in the present invention, a high temperature is, for example, an atmospheric temperature of about 60 to 70° C., and room temperature is an atmospheric temperature of about 25° C.

For a fuller understanding of the nature and advantages of the invention, reference should be made to the ensuing detailed description taken in conjunction with the accompanying drawings.

BRIEF DESCRIPTION OF THE DRAWINGS

FIGS. 2(*a*) through 2(*e*) are explanatory drawings showing a cell gap which changes in accordance with a fluctuation of an ambient temperature.

FIG. 12 is a plan view showing an irregular display color caused by a fluctuation of an ambient temperature, in a conventional liquid crystal display device.

DESCRIPTION OF THE EMBODIMENTS

Referring to FIGS. 1 through 11, the following explanation describes one embodiment of the present invention.

Figure 1:
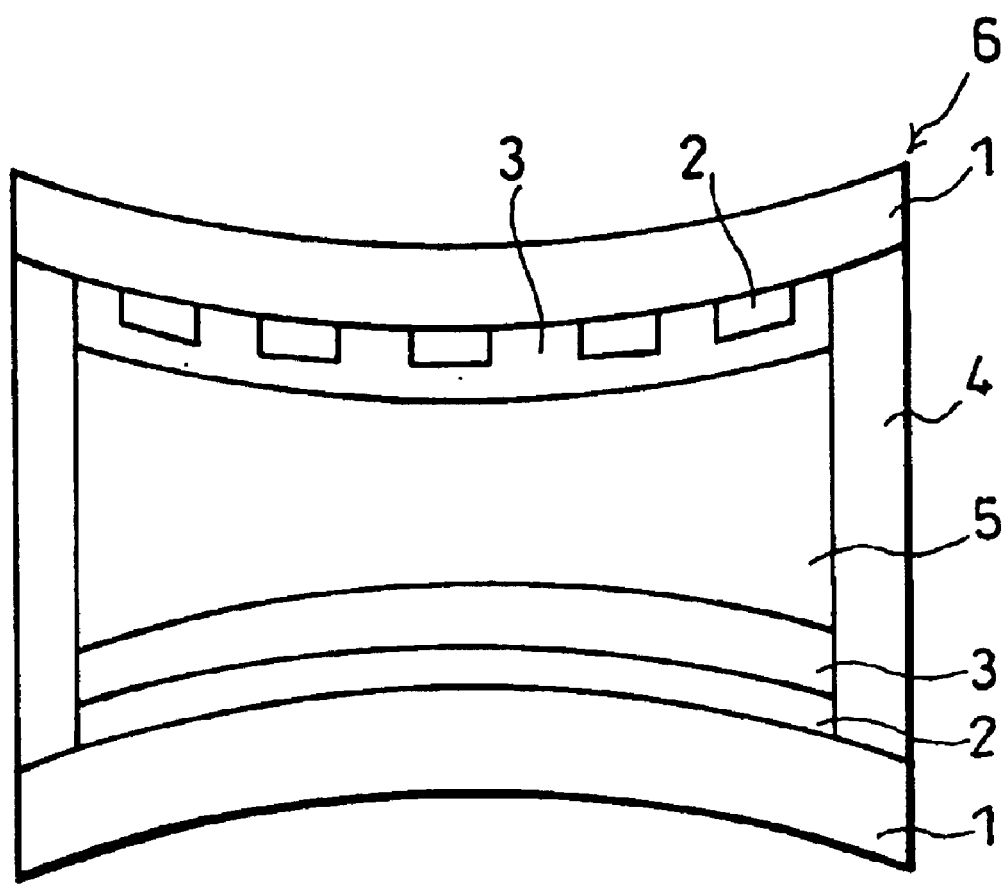
FIG. 1 is a sectional drawing showing a liquid crystal display device of the present invention at room temperature.

FIG. 1 is a sectional drawing showing a liquid crystal display device of the present embodiment at room temperature. As shown in FIG. 1, the liquid crystal display device of the present embodiment includes a pair of insulating substrates 1 which oppose each other, and display electrodes 2 and alignment films 3 which are disposed in order on the insulating substrates 1. The display electrode 2 is made of transparent ITO (indium tin oxide). In addition to the above members, the liquid crystal display device of the present invention can be provided with a color filter for providing a color display, a protection film, a smoothing film, an insulating film, and the like. Moreover, as for the display electrode 2, an opaque electrode or a reflective or polarizing electrode can be adopted. As for the insulating substrate 1, it is possible to adopt a thin glass substrate or plastic substrate with a thickness of 0.55 mm or less.

Further, a pair of the insulating substrates 1, on which the above thin films are formed, are bonded to each other via a sealing material disposed on a circumference of the insulating substrates 1. In the present embodiment, a thermosetting and one-pack epoxy sealing material is adopted as a sealing material 4.

Seal internal spacers (not shown) are disposed in the sealing material 4, and cell internal spacers (not shown) are disposed so as to be surrounded by the sealing material 4 and to form a gap between the insulating substrates 1. Furthermore, liquid crystal 5 is filled into the gap so as to complete a liquid crystal layer.

Moreover, ball glass beads are adopted as the seal internal spacers, and plastic beads are adopted as the cell internal spacers. Unlike a glass fiber which has been conventionally used, the glass beads are balls, so that they do not vertically overlap one another. Therefore, a cell gap can be readily controlled. Further, plastic beads, which can flexibly transform, are used in the liquid crystal cell 6 so as to respond to a change in the shape of the liquid crystal cell 6.

Additionally, in order to prevent an irregular display color, that is caused by a difference in thermal expansion amounts of materials constituting the liquid crystal display device, at an upper limit of an operating temperature, a cell gap, which is a thickness of the liquid crystal layer, is gradually increased from the center to an end of the display area at room temperature, in a range that no irregular display color appears. In other words, a pair of the cone-shaped insulating substrates 1 are bonded to each other such that projecting surfaces of the substrates oppose each other.

In the liquid crystal display device which is formed in the above process, when the operating temperature is raised, the liquid crystal cell 6 expands due to a difference in thermal expansion amounts between the sealing material 4 and the liquid crystal 5, as shown in FIG. 2(*a*). However, a cell gap of the liquid crystal cell 6 is formed so as to be smaller in the center of the display area at room temperature, so that it is possible to reduce a cell gap difference between the center and an end of the display area in the liquid crystal cell 6. Particularly, this arrangement is effective in an STN liquid crystal display device operating in a wide temperature range (−20–7° C.).

After careful consideration, it is understood that when a cell gap fluctuates due to a change in an atmospheric temperature (temperature increase), in the case of a cell gap difference of 0.1 μm or more between the center of the liquid crystal cell 6 and a part around the sealing material 4 at a high temperature (70° C.), an irregular display color appears; meanwhile, in the case of a cell gap difference of 0.05 μm or less, it is difficult to visually observe an irregular display color. In contrast, at room temperature (25° C.), when a cell gap difference is 0.13 μm or more between the center of the liquid crystal cell 6 and a part around the sealing material 4, an irregular display color appears; meanwhile, when the difference is 0.08 μm or less, it is difficult to visually observe an irregular display color.

Therefore, it is found that in order to prevent an irregular display color at a high temperature (70° C.) and at room temperature (25° C.), the liquid crystal cell 6 is formed such that the cell gap gradually increases from the center to an end of the display area at room temperature with a thickness of less than 0.13 μm, preferably 0.08 μm or less.

Figure 3:
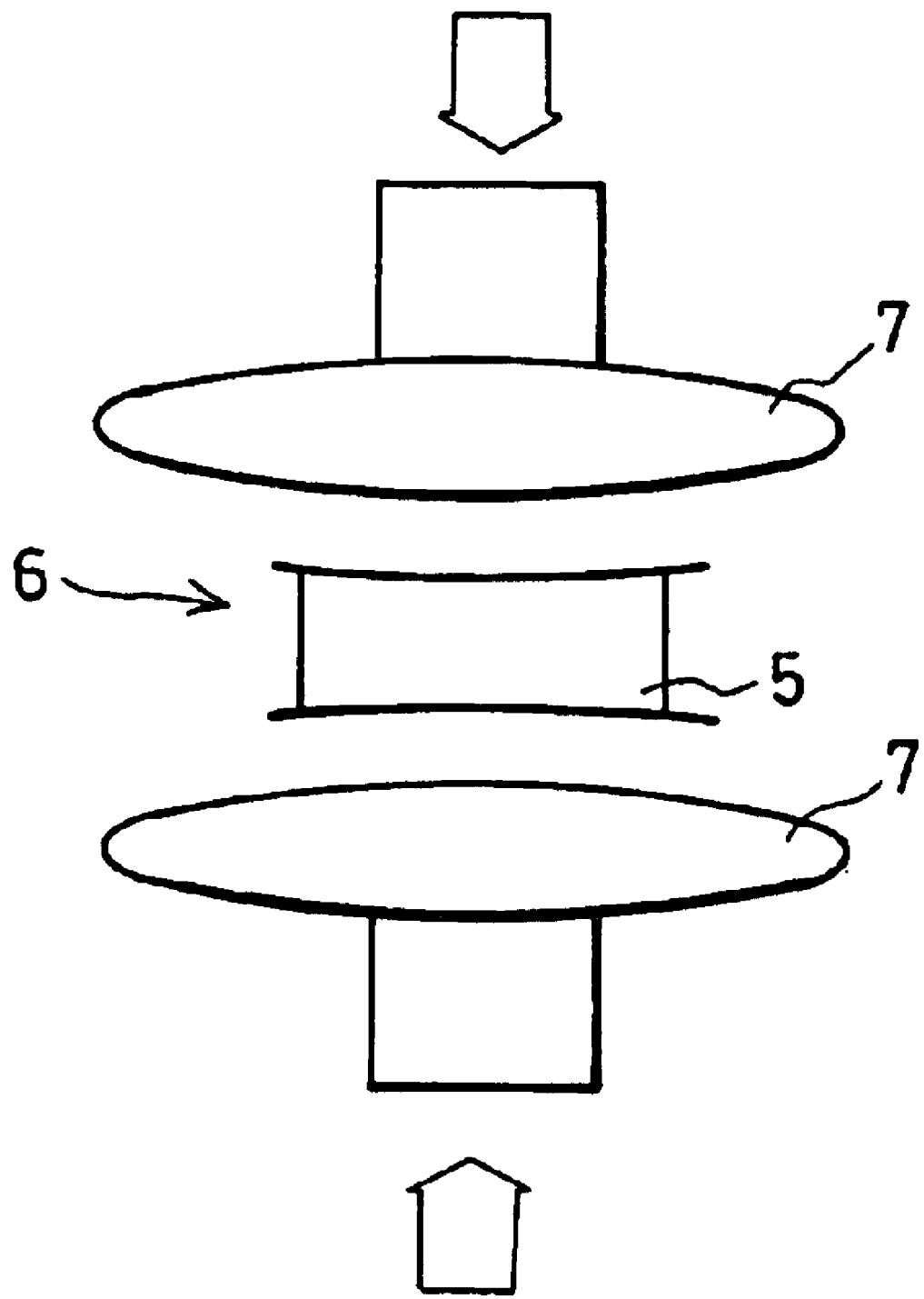
FIG. 3 is an explanatory drawing showing a manufacturing method of the liquid crystal display device of the present invention.

Such a liquid crystal display device is manufactured as follows: as shown in FIG. 3, the liquid crystal 5 is filled, and an inlet is sealed while a pressure is applied from upward and downward by pressurizers 7, which pressurize the liquid crystal cell 6 to form cones thereon. However, any other method can be adopted for manufacturing the device.

EXAMPLE 1

Firstly, referring to FIG. 1, the following explanation describes a liquid crystal display device of Example 1. As the insulating substrate 1, soda glass is adopted with an outer dimension of 34 mm×29 mm and a thickness of 0.4 mm. An epoxy resin is adopted for the sealing material 4. Many glass beads are mixed into the sealing material 4 as the seal internal spacers, and plastic beads are mixed into the liquid crystal cell 6 as the cell internal spacers.

Figure 4:
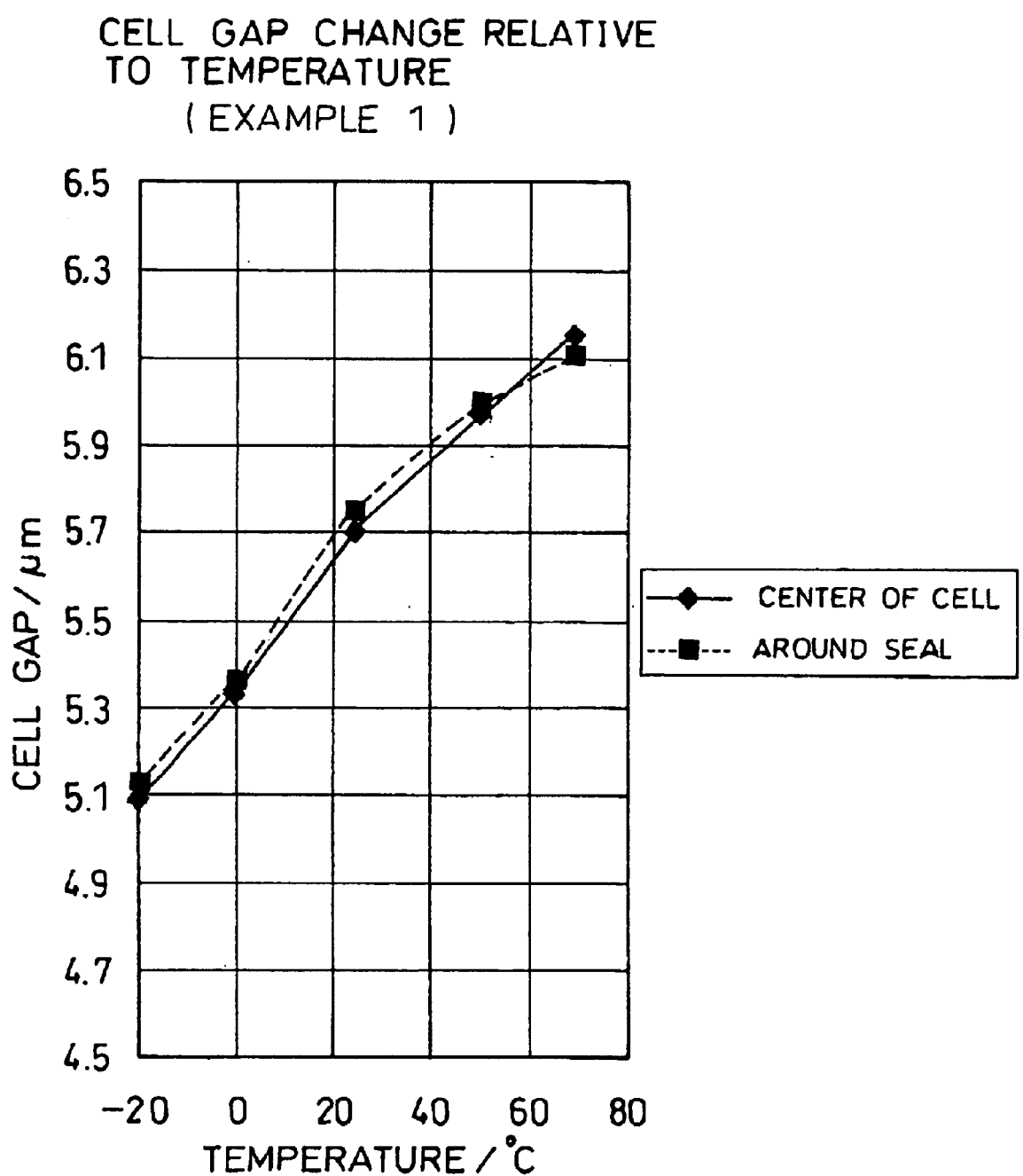
FIG. 4 is a graph showing a change in a cell gap relative to a temperature, regarding one example of the present invention.

In this case, as shown in FIG. 4, a cell gap is 5.70 μm in the center of the cell (center of the display area) and 5.75 μm (average value of measurement results at 20 points around the display area) around the seal (end of the display area) at 25° C. In the liquid crystal cell 6, a cell gap gradually increases from the center to an end of the display area.

FIG. 4 shows measurement results of cell gap fluctuations relative to atmospheric temperature fluctuations, regarding the center and a part around the seal of the liquid crystal cell 6. The higher the atmospheric temperature is, the liquid crystal 5 expands further. The cell gap increases both in the center and around the seal. FIG. 2(*a*) is a sectional view of the liquid crystal cell 6 when an atmospheric temperature is 25° C. (room temperature) and 70° C. (high temperature).

Upon confirming the display of the liquid crystal display device of the Example 1, it is found that display properties are fully exhibited at room temperature and an irregular display color such as a color fading to white, that has been a problem conventionally, does not appear in the center of the cell at a high temperature.

EXAMPLE 2

Figure 5:
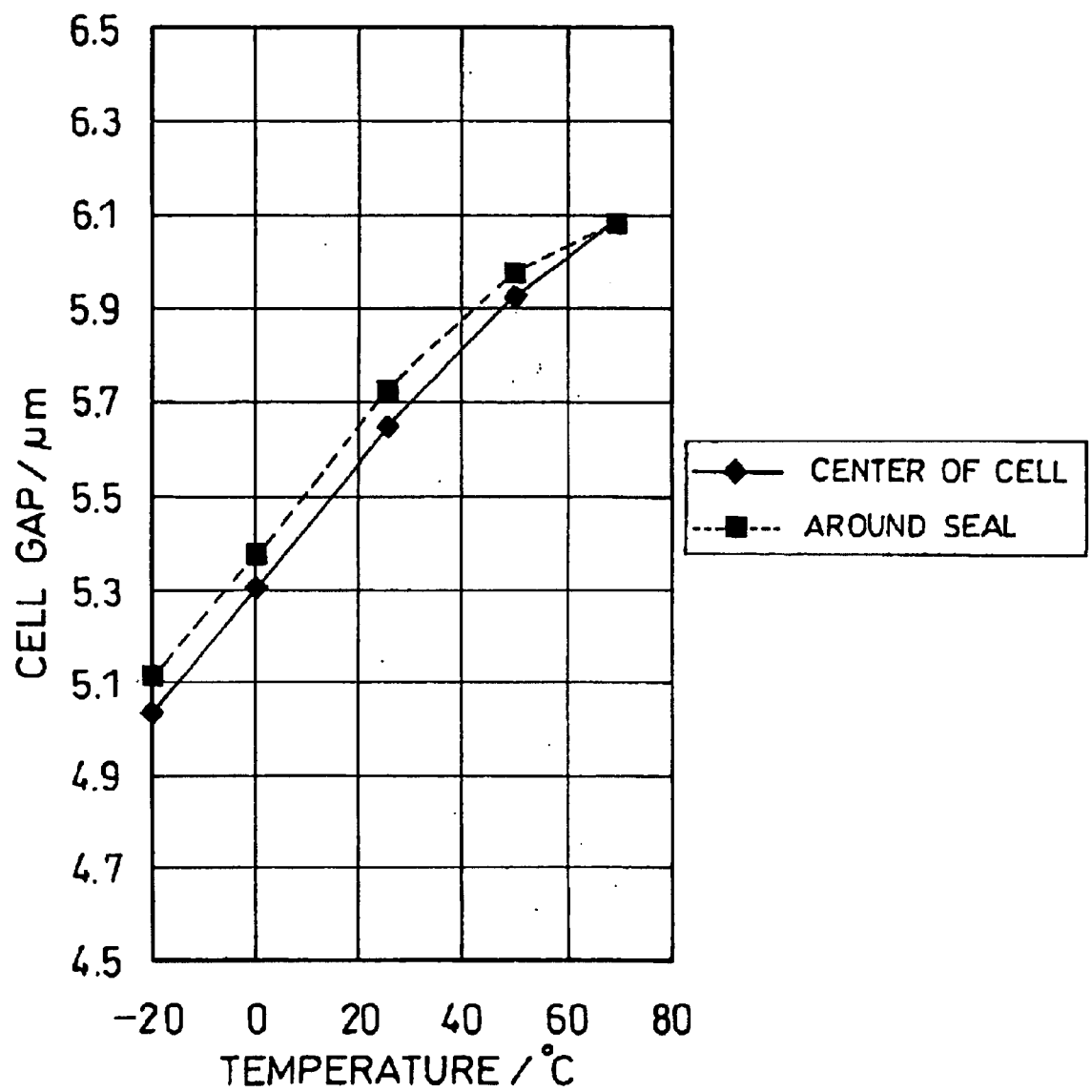
FIG. 5 is a graph showing a change in a cell gap relative to a temperature, regarding another example of the present invention.

A liquid crystal display device of Example 2 has the same construction as Example 1. As shown in FIG. 5, a cell gap is 5.65 μm in the center of the cell (center of the display area) and 5.73 μm (average value of measurement results at 20 points around the display area) around the seal (end of the display area) at 25° C. In the liquid crystal cell 6, the cell gap gradually increases from the center to an end of the display area.

FIG. 5 shows measurement results of cell gap fluctuations relative to atmospheric temperature fluctuations, regarding the center and a part around the seal of the liquid crystal cell 6. The higher the atmospheric temperature is, the liquid crystal 5 expands further. The cell gap increases both in the center and around the seal. FIG. 2(*b*) is a sectional view of the liquid crystal cell 6 when an atmospheric temperature is 25° C. (room temperature) and 70° C. (high temperature).

Upon confirming the display of the liquid crystal display device of the Example 2, it is found that display properties are fully exhibited at room temperature and an irregular display color such as a color fading to white, that has been a problem conventionally, does not appear in the center of the cell at a high temperature.

EXAMPLE 3

Figure 6:
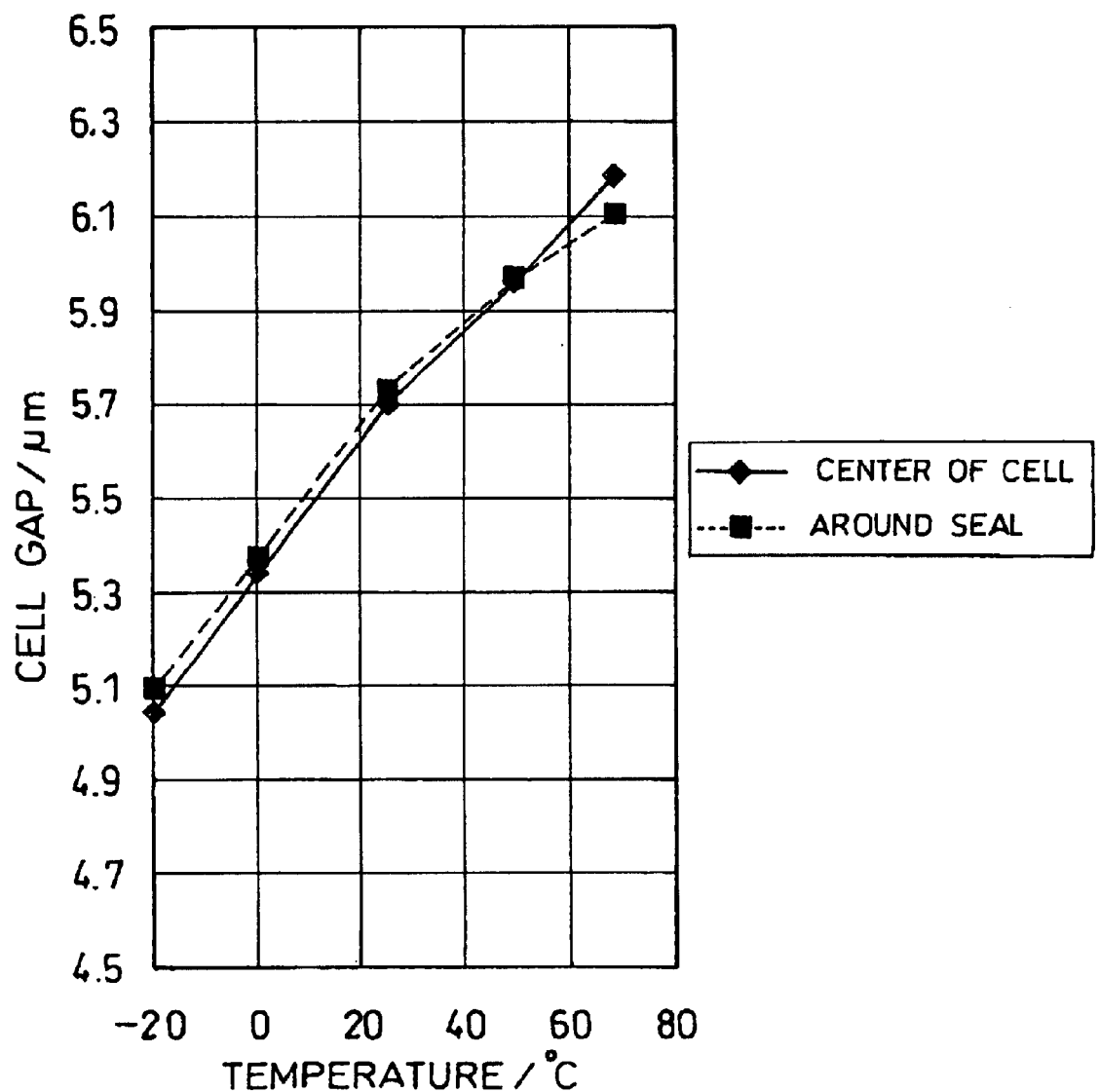
FIG. 6 is a graph showing a change in a cell gap relative to a temperature, regarding still another example of the present invention.

A liquid crystal display device of Example 3 has the same construction as Example 1. As shown in FIG. 6, a cell gap is 5.70 μm in the center of the cell (center of the display area) and 5.73 μm (average value of measurement results at 20 points around the display area) around the seal (end of the display area) at 25° C. In the liquid crystal cell 6, the cell gap gradually increases from the center to an end of the display area.

FIG. 6 shows measurement results of cell gap fluctuations relative to atmospheric temperature fluctuations, regarding the center and a part around the seal of the liquid crystal cell 6. The higher the atmospheric temperature is, the liquid crystal 5 expands further. The cell gap increases both in the center and around the seal.

Upon confirming the display of the liquid crystal display device of the Example 3, it is found that display properties are fully exhibited at room temperature and an irregular display color such as a color fading to white, that has been a problem conventionally, does not appear in the center of the cell at a high temperature.

EXAMPLE 4

Figure 7:
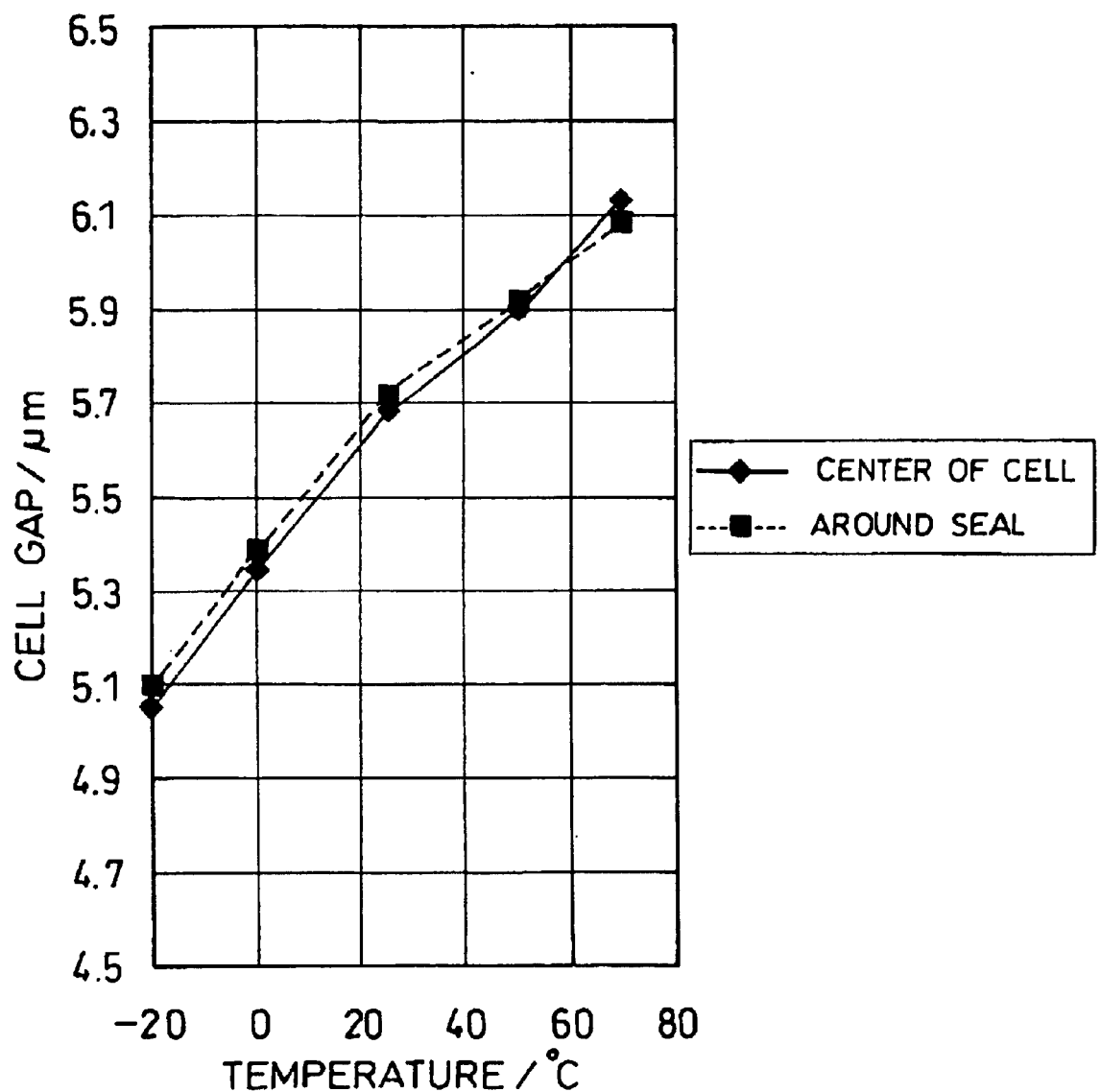
FIG. 7 is a graph showing a change in a cell gap relative to a temperature, regarding still another example of the present invention.

A liquid crystal display device of Example 4 has the same construction as Example 1, and the insulating substrate 1 is made of soda glass with a thickness of 0.55 mm. As shown in FIG. 7, a cell gap is 5.68 μm in the center of the cell (center of the display area) and 5.72 μm (average value of measurement results at 20 points around the display area) around the seal (end of the display area) at 25° C. In the liquid crystal cell 6, the cell gap gradually increases from the center to an end of the display area.

FIG. 7 shows measurement results of cell gap fluctuations relative to atmospheric temperature fluctuations, regarding the center and a part around the seal of the liquid crystal cell 6. The higher the atmospheric temperature is, the liquid crystal 5 expands further. The cell gap increases both in the center and around the seal.

Upon confirming the display of the liquid crystal display device of the Example 4, it is found that display properties are fully exhibited at room temperature and an irregular display color such as a color fading to white, that has been a problem conventionally, does not appear in the center of the cell at a high temperature.

Comparative Example 1

A liquid crystal display device of Comparative Example 1 has the same construction as Example 1. As shown in FIG.

8, a cell gap is 5.71 μm in the center of the cell (center of the display area) and 5.71 μm (average value of measurement results at 20 points around the display area) around the seal (end of the display area) at 25° C. In the liquid crystal cell 6, an even cell gap is maintained from the center to an end of the display area.

Figure 8:
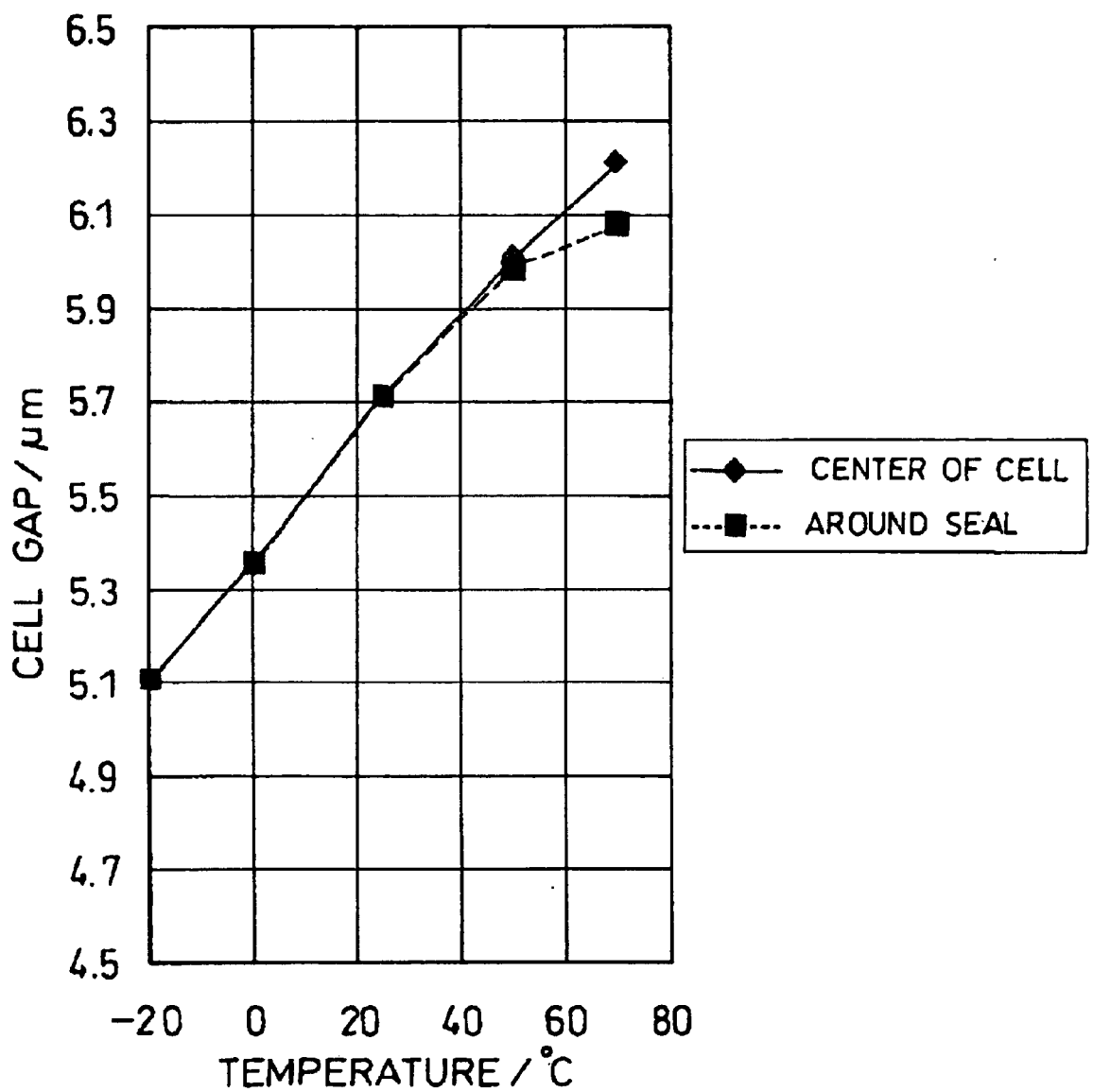
FIG. 8 is a graph showing a change in a cell gap relative to a temperature, regarding one comparative example.

FIG. 8 shows measurement results of cell gap fluctuations relative to atmospheric temperature fluctuations, regarding the center and a part around the seal of the liquid crystal cell 6. The higher the atmospheric temperature is, the liquid crystal 5 expands further. The cell gap increases both in the center and around the seal. FIG. 2(c) is a sectional view of the liquid crystal cell 6 when an atmospheric temperature is 25° C. (room temperature) and 70° C. (high temperature).

Upon confirming the display of the liquid crystal display device of Comparative Example 1, it is found that display properties are fully exhibited at room temperature. However, an irregular display color such as a color fading to white, that has been a problem conventionally, appears in the center of the cell.

Comparative Example 2

A liquid crystal display device of Comparative Example 2 has the same construction as Example 1. As shown in FIG. 2(d), a cell gap is 5.68 μm in the center of the cell (center of the display area) and 5.74 μm (average value of measurement results at 20 points around the display area) around the seal (end of the display area) at 25° C. In the liquid crystal cell 6, an even cell gap is maintained in the center of the display area, and the cell gap increases merely in an end of the display area.

Figure 9:
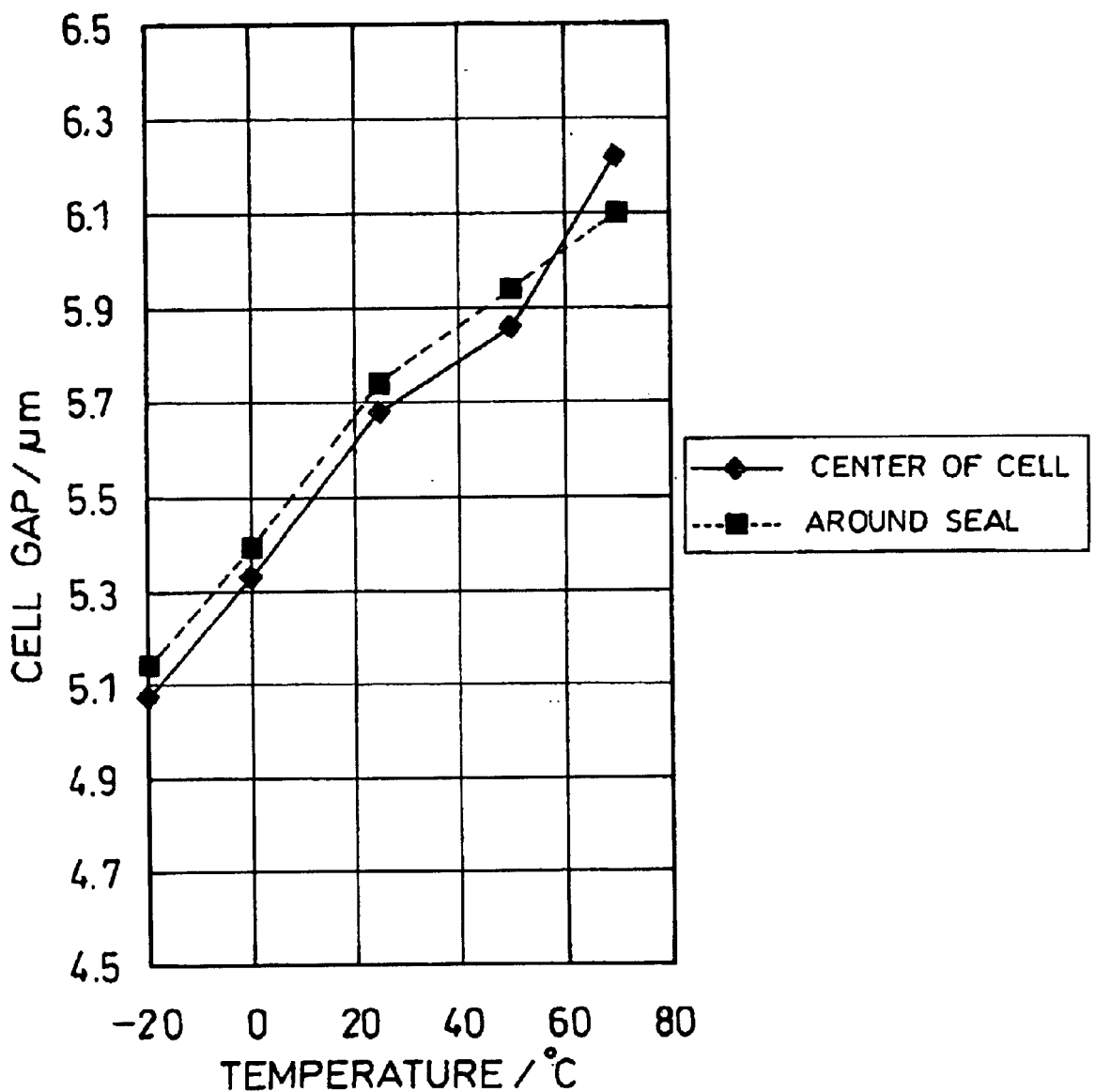
FIG. 9 is a graph showing a change in a cell gap relative to a temperature, regarding another comparative example.

FIG. 9 shows measurement results of cell gap fluctuations relative to atmospheric temperature fluctuations, regarding the center and a part around the seal of the liquid crystal cell 6. The higher the atmospheric temperature is, the liquid crystal 5 expands further. The cell gap increases both in the center and around the seal. FIG. 2(c) is a sectional view of the liquid crystal cell 6 when an atmospheric temperature is 25° C. (room temperature) and 70° C. (high temperature).

Upon confirming the display of the liquid crystal display device of Comparative Example 2, it is found that display properties are fully exhibited at room temperature. However, an irregular display color such as a color fading to white, that has been a problem conventionally, appears in the center of the cell.

Comparative Example 3

Figure 10:
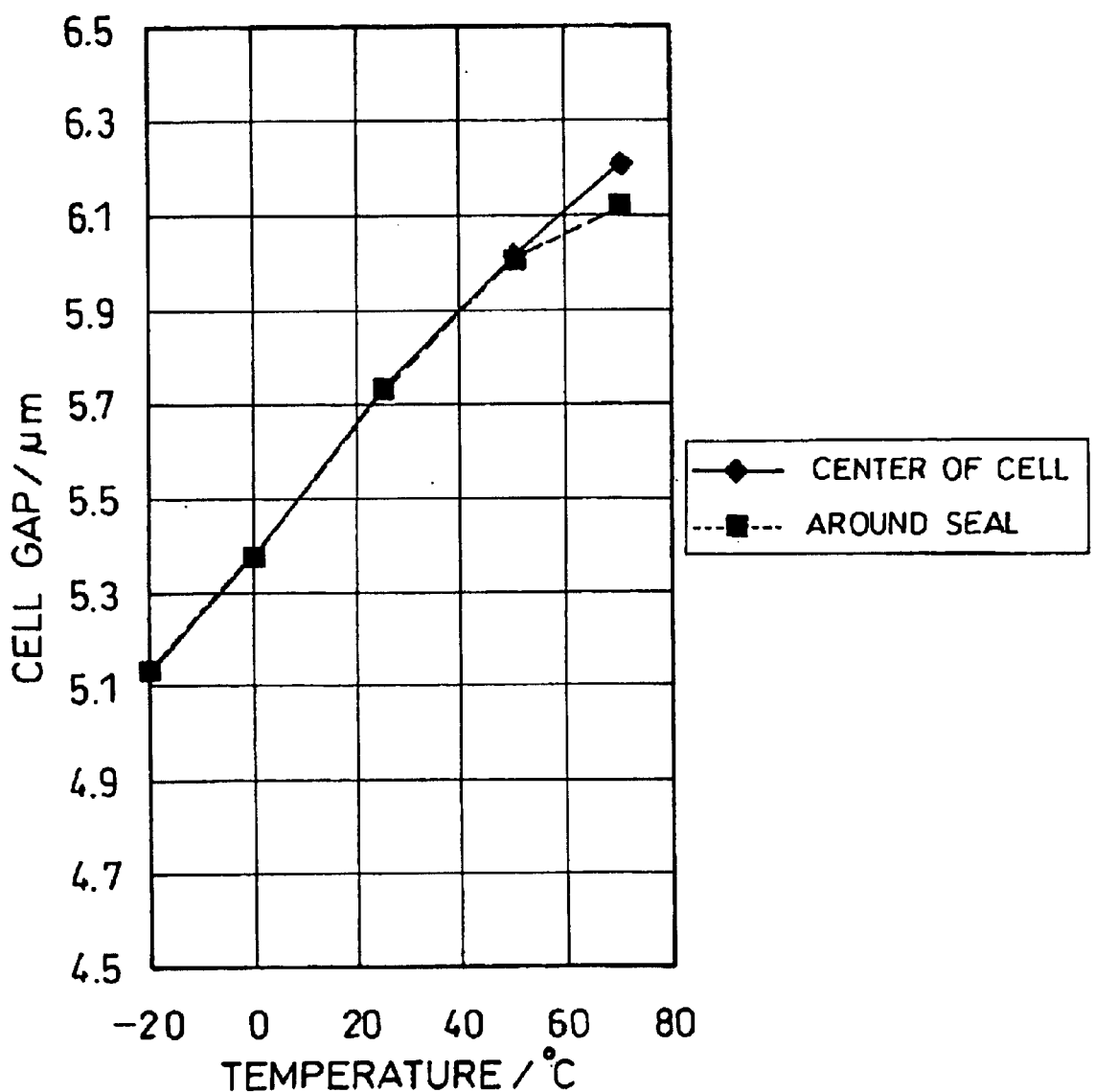
FIG. 10 is a graph showing a change of a cell gap relative to a temperature regarding still another comparative example.

A liquid crystal display device of Comparative Example 3 has the same construction as Example 1 and the insulating substrate 1 is made of soda glass with a thickness of 0.6 mm. As shown in FIG. 10, a cell gap is 5.73 μm in the center of the cell (center of the display area) and 5.73 μm (average value of measurement results at 20 points around the display area) around the seal (end of the display area) at 25° C. In the liquid crystal cell 6, an even cell gap is maintained from the center to an end of the display area.

FIG. 10 shows measurement results of cell gap fluctuations relative to atmospheric temperature fluctuations, regarding the center and a part around the seal of the liquid crystal cell 6. The higher the atmospheric temperature is, the liquid crystal 5 expands further. The cell gap increases both in the center and around the seal. FIG. 2(e) is a sectional view of the liquid crystal cell 6 when an atmospheric temperature is 25° C. (room temperature) and 70° C. (high temperature).

Upon confirming the display of the liquid crystal display device of Comparative Example 3, it is found that display properties are fully exhibited at room temperature, and an irregular display color such as a color fading to white, that has been a problem conventionally, appears in the center of the cell; however, the irregular display color is hardly confirmed by visual observation.

This is probably because soda glass, which is adopted as the insulating substrate 1 with a thickness of 0.6 mm, maintains a cell gap with a force being larger than a cell gap fluctuation, which is caused by a difference in thermal expansion amounts between the liquid crystal 5 and the sealing material 4.

In Comparative Example 3, an irregular display color at 70° C. (high temperature) is hardly confirmed by visual observation. Further, when the present invention is applied to a liquid crystal display device in which soda glass is adopted as the insulating substrate 1 with a thickness of 0.6 mm, the display quality can be improved.

Comparative Example 4

Figure 11:
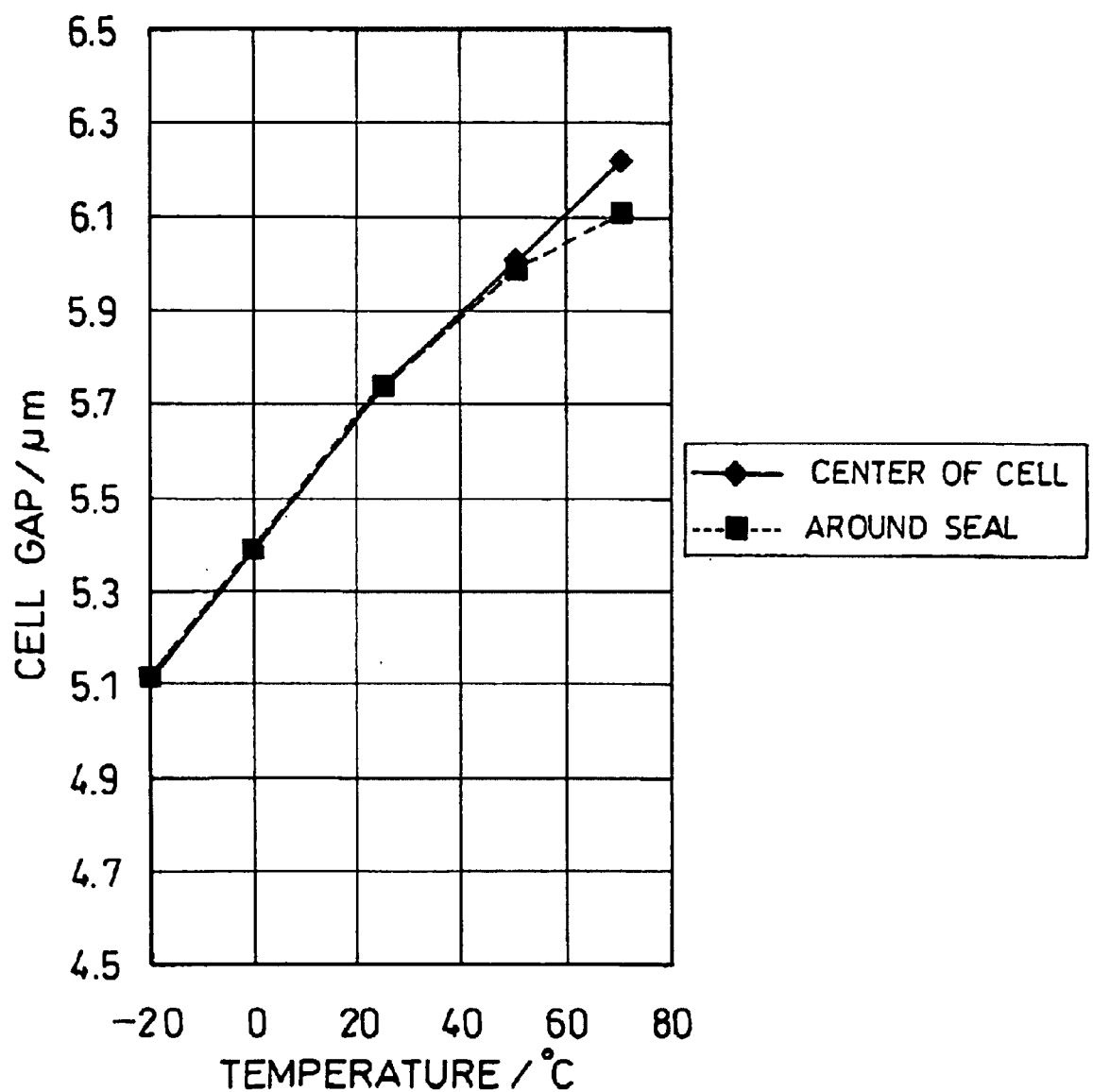
FIG. 11 is a graph showing a change in a cell gap relative to a temperature, regarding still another comparative example.
Figure 13:
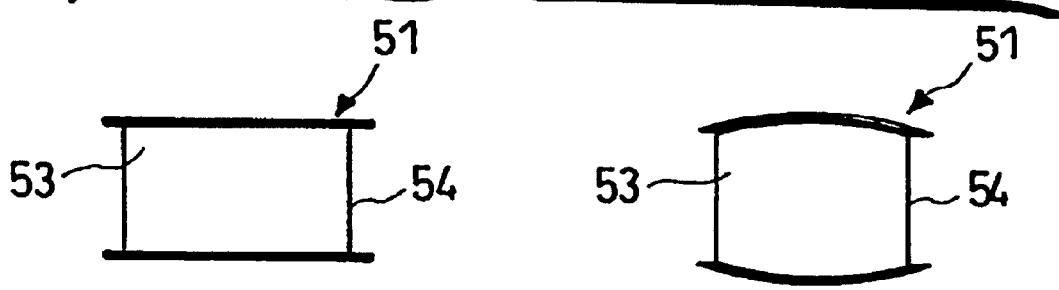
FIG. 13 is a sectional view showing a cell gap which changes in accordance with a fluctuation of an ambient temperature, in the conventional liquid crystal display device.
Figure 14:
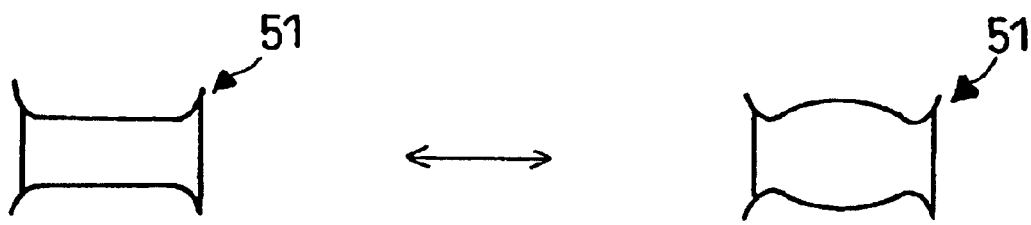
FIG. 14 is a sectional view showing a cell gap which changes in accordance with a fluctuation of an ambient temperature, in another conventional liquid crystal display device.

A liquid crystal display device of Comparative Example 4 has the same construction as Example 1 and the insulating substrate 1 is made of soda glass with a thickness of 0.55 mm. As shown in FIG. 11, in the liquid crystal display device of Comparative Example 4, a cell gap is 5.74 μm in the center of the cell (center of the display area) and 5.74 μm (average value of measurement results at 20 points around the display area) around the seal (end of the display area) at 25° C. In the liquid crystal cell 6, an even cell gap is maintained from the center to an end of the display area.

FIG. 11 shows measurement results of cell gap fluctuations relative to atmospheric temperature fluctuations, regarding the center and a part around the seal of the liquid crystal cell 6. The higher the atmospheric temperature is, the liquid crystal 5 expands further. The cell gap increases both in the center and around the seal.

Upon confirming the display of the liquid crystal display device of Comparative Example 4, it is found that display properties are fully exhibited at room temperature. However, an irregular display color such as a color fading to white, that has been a problem conventionally, appears in the center of the cell.

Here, Table 2 shows cell gaps between the center of the cell and a part around the seal, and (cell gaps in the center of the cell)—(cell gaps around the seal), regarding Examples 1 through 4 and Comparative Examples 1 through 4.

TABLE 2

|  |  | TEMPERATURE/° C. | −20 | 0 | 25 | 50 | 70 |
|---|---|---|---|---|---|---|---|
| EXAMPLE 1 | CENTER OF CELL | | 5.08 | 5.32 | 5.70 | 5.97 | 6.17 |
|  | AROUND SEAL | | 5.13 | 5.36 | 5.75 | 6.00 | 6.12 |
|  | CELL GAP DIFFERENCE | | −0.05 | −0.04 | −0.05 | −0.03 | 0.05 |
| EXAMPLE 2 | CENTER OF CELL | | 5.03 | 5.30 | 5.65 | 5.93 | 6.09 |
|  | AROUND SEAL | | 5.11 | 5.37 | 5.73 | 5.98 | 6.09 |
|  | CELL GAP DIFFERENCE | | −0.08 | −0.07 | −0.08 | −0.05 | 0.00 |

TABLE 2-continued

| | TEMPERATURE/° C. | −20 | 0 | 25 | 50 | 70 |
|---|---|---|---|---|---|---|
| EXAMPLE 3 | CENTER OF CELL | 5.04 | 5.34 | 5.70 | 5.96 | 6.19 |
| | AROUND SEAL | 5.09 | 5.37 | 5.73 | 5.97 | 6.11 |
| | CELL GAP DIFFERENCE | −0.05 | −0.03 | −0.03 | −0.01 | 0.08 |
| EXAMPLE 4 | CENTER OF CELL | 5.04 | 5.34 | 5.68 | 5.90 | 6.14 |
| | AROUND SEAL | 5.09 | 5.38 | 5.72 | 5.92 | 6.09 |
| | CELL GAP DIFFERENCE | −0.05 | −0.04 | −0.04 | −0.02 | 0.05 |
| COMPARATIVE EXAMPLE 1 | CENTER OF CELL | 5.09 | 5.36 | 5.71 | 6.02 | 6.22 |
| | AROUND SEAL | 5.10 | 5.35 | 5.71 | 5.99 | 6.09 |
| | CELL GAP DIFFERENCE | −0.01 | 0.01 | 0.00 | 0.03 | 0.13 |
| COMPARATIVE EXAMPLE 2 | CENTER OF CELL | 5.07 | 5.33 | 5.68 | 5.86 | 6.22 |
| | AROUND SEAL | 5.14 | 5.39 | 5.74 | 5.94 | 6.10 |
| | CELL GAP DIFFERENCE | −0.07 | −0.06 | −0.06 | −0.08 | 0.12 |
| COMPARATIVE EXAMPLE 3 | CENTER OF CELL | 5.12 | 5.37 | 5.73 | 6.02 | 6.21 |
| | AROUND SEAL | 5.13 | 5.37 | 5.73 | 6.01 | 6.12 |
| | CELL GAP DIFFERENCE | −0.01 | 0.00 | 0.00 | 0.01 | 0.09 |
| COMPARATIVE EXAMPLE 4 | CENTER OF CELL | 5.11 | 5.38 | 5.74 | 6.01 | 6.22 |
| | AROUND SEAL | 5.12 | 5.39 | 5.74 | 5.99 | 6.11 |
| | CELL GAP DIFFERENCE | −0.01 | −0.01 | 0.00 | 0.02 | 0.11 |

The above explanation describes the liquid crystal display device of the present invention. Upon manufacturing the liquid crystal display device, the cell gaps are irregular around the seal. Thus, in the present comparative example, regarding 20 points around the seal, an average value of the cell gaps is found and used for consideration. Besides this method, it is possible to compare (a) an average value of cell gaps around the seal of each side with (b) a cell gap in the center of the cell, before consideration. Here, in the present comparative example, an irregular display color caused by a partial cell gap difference is excluded before consideration.

As described above, a first liquid crystal display device of the present invention, in which a pair of insulating substrates are bonded to each other via a sealing material and liquid crystal is filled between a pair of the insulating substrates, is characterized in that a cell gap is formed so as to gradually increase from the center to an end of a display area at room temperature.

According to the above arrangement, the cell gap is formed so as to gradually increase from the center to an end of the display area at room temperature in a range that no irregular display color appears. Hence, it is possible to smooth out a difference in thermal expansions between the liquid crystal and the sealing material when an atmospheric temperature rises, and it is possible to prevent a cell gap from being too large in the center of the display area. Consequently, an irregular display color can be eliminated.

The liquid crystal display device of the present invention is effectively used for an STN liquid crystal display device, in which an operating temperature ranges from room temperature to a high temperature. Particularly, the aforementioned problem frequently appears at a high temperature. Therefore, a cell gap is formed so as to gradually increase from the center to an end of the display area at room temperature in a range that no irregular display color appears, so that it is possible to smooth but a difference in thermal expansion amounts between the liquid crystal and the sealing material at a high temperature. Consequently, an irregular display color can be prevented at a high temperature.

Here, in the present invention, a high temperature is, for example, an atmospheric temperature of about 60 to 70° C., and room temperature is an atmospheric temperature of about 25° C.

With the arrangement of the first liquid crystal display device, a second liquid crystal display device of the present invention is characterized in that in the display area, a cell gap is smaller in the center by less than 0.13 μm than an average value of cell gaps on an end at room temperature. Hence, it is possible to prevent an irregular display color recognized as a defect at room temperature and at a high temperature.

With the arrangement of the second liquid crystal display device, a third liquid crystal display device of the present invention is characterized in that in the display area, a cell gap is smaller in the center by 0.08 μm or less than an average value of cell gaps on an end at room temperature.

With the above arrangement, in the display area, a cell gap is smaller in the center by 0.08 μm or less than an average value of cell gaps on an end at room temperature, so that it is possible to prevent an irregular display color at room temperature and at a high temperature.

With the arrangements of the first through third liquid crystal display devices, a fourth liquid crystal display device of the present invention is characterized in that a cell gap is formed so as to gradually increase from the center to an end of the display area at room temperature, and a cell gap is formed so as to gradually decrease from the center to an end of the display area at a high temperature.

With the above arrangement, a cell gap is formed so as to gradually increase from the center to an end of the display area at room temperature, and a cell gap is formed so as to gradually decrease from the center to an end of the display area at a high temperature. Namely, a cell gap gradually decreases from the center to an end of the display area at a high temperature so as to reduce a cell gap difference between the center and an end of the display area at room temperature. Thus, it is possible to achieve a more even display.

With the arrangements of the first through fourth liquid crystal display devices, a fifth liquid crystal display device of the present invention is characterized in that the insulating substrate is a glass substrate or a plastic substrate with a thickness of 0.55 mm or less.

With the above arrangement, even when a glass substrate or a plastic substrate is used as the insulating substrate with a thickness of 0.55 mm or less, that tends to cause an irregular display color due to a large influence of thermal expansion, an irregular display color can be prevented at a high temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:
   a pair of insulating substrates bonded via a sealing material, and
   liquid crystal filled between said pair of insulating substrates,
   wherein the bonded pair of insulating substrates form a cell having a center and a pair of ends, and
   wherein a cell gap is formed so as to gradually and continuously increase from the center of the cell to each of the pair of ends of a display area of the cell at room temperature.

2. The liquid crystal display device as defined in claim 1, wherein in said display area, the cell gap is smaller in the center by less than 0.13 µm than an average value of cell gaps on each of the pair of ends at room temperature.

3. The liquid crystal display device as defined in claim 2, wherein a cell gap is formed so as to gradually increase from the center to each of the pair of ends of said display area at room temperature, and a cell gap is formed so as to gradually decrease from the center to each of the pair of ends of said display area at a high temperature.

4. The liquid crystal display device as defined in claim 1, wherein in said display area, the cell gap is smaller in the center by 0.08 µm or less than an average value of cell gaps on each of the pair of ends at room temperature.

5. The liquid crystal display device as defined in claim 4, wherein a cell gap is formed so as to gradually increase from the center to each of the pair of ends of said display area at room temperature, and a cell gap is formed so as to gradually decrease from the center to each of the pair of ends of said display area at a high temperature.

6. The liquid crystal display device as defined in claim 1, wherein a cell gap is formed so as to gradually increase from the center to each of the pair of ends of said display area at room temperature, and a cell gap is formed so as to gradually decrease from the center to each of the pair of ends of said display area at a high temperature.

7. The liquid crystal display device as defined in claim 1, wherein each of said pair of insulating substrates is a glass substrate having a thickness of 0.55 mm or less.

8. The liquid crystal display device as defined in claim 1, wherein each of said pair of insulating substrates is a plastic substrate having a thickness of 0.55 mm or less.

9. The liquid crystal display device as defined in claim 1, wherein said liquid crystal display device is an STN liquid crystal display device.

10. The liquid crystal display device as defined in claim 9, wherein an operating temperature ranges virtually between −20° C. and 70° C.

11. The liquid crystal display device as defined in claim 1, wherein each of the pair of insulating substrates is cone-shaped.

12. The liquid crystal display device as defined in claim 1, wherein each of the pair of insulating substrates forming the cell is concave inward.

13. A liquid crystal display device, comprising:
   a pair of insulating substrates bonded via a sealing material, and
   liquid crystal filled between said pair of insulating substrates,
   wherein the bonded pair of insulating substrates form a cell having a center and a pair of ends, and
   wherein a cell gap is formed so as to gradually and continuously increase from the center to each of the pair of ends of a display area at room temperature, and
   wherein the cell gap is limited so that no irregular display color appears.

14. The liquid crystal display device as defined in claim 13, wherein each of the pair of insulating substrates is cone-shaped.

15. The liquid crystal display device as defined in claim 13, wherein each of the pair of insulating substrates forming the cell is concave inward.

16. A liquid crystal display device, comprising:
   a pair of insulating substrates bonded via a sealing material, and
   liquid crystal filled between said pair of insulating substrates,
   wherein the bonded pair of insulating substrates crystal form a cell having a center and a pair of ends, and
   wherein a cell gap is smaller in the center than any other part of a display area at room temperature, and
   wherein a cell gap difference is set at a predetermined value between the center and at least on one of the pair of ends of said display area so that at a high temperature no display defect occurs.

17. The liquid crystal display device as defined in claim 16, wherein each of the pair of insulating substrates is cone-shaped.

18. The liquid crystal display device as defined in claim 16, wherein each of the pair of insulating substrates forming the cell is concave inward.

* * * * *